United States Patent [19]

Signouret et al.

[11] 4,126,482
[45] Nov. 21, 1978

[54] THIOL POLYESTERS

[75] Inventors: Jean Baptiste Signouret, Billere; Albert Nicolau, Pau, both of France

[73] Assignee: Societe Nationale des Petroles d'Aquitaine, Courbevoie, France

[21] Appl. No.: 734,869

[22] Filed: Oct. 22, 1976

Related U.S. Application Data

[63] Continuation of Ser. No. 545,409, Jan. 30, 1975, abandoned.

[51] Int. Cl.$^2$ .......................... C08L 95/00; C09D 3/24
[52] U.S. Cl. ..................................... 106/274; 106/275; 106/279; 106/280; 106/316; 260/28 R; 260/28.5 AS
[58] Field of Search ......... 106/273, 274, 275, 287 SC; 260/28, 28.5 AS

[56] References Cited

U.S. PATENT DOCUMENTS

| | | | |
|---|---|---|---|
| 2,517,564 | 8/1950 | Harman et al. | 106/273 R |
| 2,877,129 | 3/1959 | Hardman | 106/279 |
| 2,910,922 | 11/1959 | Horning | 260/28 X |
| 3,434,852 | 3/1969 | Louthan | 106/287 SC X |
| 3,674,525 | 7/1972 | Louthan | 106/287 SC |
| 3,721,578 | 3/1973 | Bennett et al. | 106/287 SC |
| 3,749,688 | 7/1973 | Mihelic et al. | 260/28 |
| 3,810,857 | 5/1974 | Garrigues et al. | 260/28 |

*Primary Examiner*—Joan E. Welcome
*Attorney, Agent, or Firm*—Norman S. Blodgett; Gerry A. Blodgett

[57] ABSTRACT

New polythiols-polyesters and corresponding polysulphides in the —SH group wherein sulphur is contained in the alcohol residue after the formation of esters. These polyesters are derived from aliphatic polyacids, saturated or not, wherein the molecule contains a minimum of 15 atoms of carbon. They are formulated by the action of a mercapto-alcanol on the corresponding polyacid, in a liquid which gives an azeotropic mixture with water. These products are useful as additives to asphalts, bituminous products, coatings, mastics and cements.

5 Claims, No Drawings

THIOL POLYESTERS

This is a continuation of application Ser. No. 545,409 filed Jan. 30, 1975 now abandoned.

The present invention applies to a new class of sulphur polyesters, namely, polythiol polyesters and new organic polysulphurs derived from these polyesters. They consist, likewise, of basic bituminous products, asphalts, tars, or other similar heavy hydrocarbonated materials tied in with these new compounds. The invention applies equally to processes for the formulation of these products.

Various organic polysulphurs, as well as certain di-thiol diesters, are known in the art and utilized as plastic or plastifying bodies. The present invention is the result of unexpected confirmation that, in certain applications, the new polythiol polyesters, or their corresponding polysulphurs, derived from certain aliphatic polyacids, make possible interesting new applications. There are, for example, those that exhibit an adhesive character on different materials, particularly gravel. This adhesiveness is improved by the presence of sulphur in the polyester molecule of the acids in question. This improvement in adhesive character deserves particular attention in regard to bituminous products, as these products have had the sulphur polyester added following the invention.

The new compounds, following the invention, are polythiol polyesters derived from aliphatic polyacids further defined by the esterification of these acids by means of thiol alcohols. These are, then, the polyesters from the alcohol residue of ester formation grounded as —SH. Similarly included in the invention are the corresponding polysulphurs, that is to say, the polyesters from the alcohol residue of the ester formation which have atoms of sulphur.

Acids which can become part of the composition of the new sulphur polyesters are saturated, and non-saturated aliphatic acids having a minimum of two carboxyl functions, and generally 2 to 5 —COOH groups, the total minimum number or atoms of carbon of the polyacid being 15. Preferably, the polyacids used are in C15 to C66. They can be constituted by long chain acids, obtained by oxydation of paraffins and/or olefins. We can use, for example, tetradecane dicarboxylic and tetracarboxylin acids. Other examples are di, tri, tetra acids, or pentacarboxylics derived of octadecanes, eicosanes, tri-acontanes, nonadecane-dicarboxylics, tetracosane-dicarboxylic, tricarboxylics, tetra-carboxylics, and/or penta-carboxylics, hexadecenedicarboxylics, dicarboxylic octadenienes, tricarboxylics octadecatrienes, etc.

One class of polyacids which rank in the aforementioned series is constituted by oligomerous, non-saturated aliphatic acids. These polyacids can be derived from different ethylenic monomerous acids which can contain up to 30 atoms of carbon or more.

For practical use, polyesters-polythiols of oligomer bases of fatty acids of C6 to C24 and preferably C11 to C18 are particularly suitable. The monomerous acids entering into the composition of these polythiol polyesters should contain a minimum of one double linkage, but they can use several to advantage, as is, for example, in the case of linoleic acids (octadecadiene-carboxylic) or linolenic (octadecatriene-carboxylic). On the other hand, these acids can take on other groupings, such as, nitrile, sulfo, etc., and, more particularly, OH, for example, in ricinoleic acid.

The new non-saturated polythiol polyesters of this particular class, in accordance with the invention, are represented in the aggregate in the general formula:

$$(R'-CH=CH-R''-COO-R-SH)_n \quad (1)$$

in which R is an alkylene radical, most often in C1 to C12 and preferably C2 to C6; R' is an atom of hydrogen or an aliphatic, hydrocarbon chain, possible of containing one or several double linkages and possibly substitutes of the type, sulfo, nitrile, hydroxy, etc.; R" is an alkenylic chain which can have, like R', double linkages, and/or, substitutes, but R" is not necessary. The degree of polymerization, $n$, is generally low, not exceeding 10 or better not exceeding 6. More often, $n$ is equal to 2 or 3, that is to say that the polythiol polyester is a dimer or a trimer of the unit thiol ester represented in the parenthesis of formula (1).

The hydrocarbon chains R' and/or R" can be cyclic in the oligomerous molecule as actually determined for the dimer of the linoleic acid for example (Journal American Org. Chemical Society - December 1962 - vol. 39 - page 535).

Thus, as noted above, in other terms, the unit acid group, R'-CH=CH-R"-COO, in formula (1) contains, in general, up to 30 atoms of carbon, but preferably 6 to 24 and more preferably 11 to 18.

Particularly useful products, at the same time easily accessible industrially, are derived from various natural fatty acids, mainly in C18, particularly oleic, elaidic, linoleic, linolenic, rinoleic acids, etc. By virtue of this, for example, for oleic acid, that is to say, octadecene-8-carboxylic-1 acid, R' is $CH_3-(CH_2)_7-$, the aggregate formula being:

$$(CH_3-(CH_2)_7-CH=CH-(CH_2)_7-COO-R-SH)_n \quad (2)$$

In the case of the dimer ($n=2$), the structure of the corresponding diester diothol can be written:

$$\begin{array}{l} CH_3-(CH_2)_7-CH=C-(CH_2)_7-COO-R-SH \\ \phantom{CH_3-(CH_2)_7-CH=C}| \\ CH_3-(CH_2)_7-CH_2-CH-(CH_2)_7-COO-R-SH \end{array} \quad (3)$$

The hydrocarbon group R, binding the carboxyl to the thiol (—SH) function can be linearly spread out, for example, ethenyl, propenyl, iso-propenyl, butenyl, iso-butenyl, hexenyl, octenyl, iso-octenyl, etc. Also, for example, terminal groupings, —COO—R—SH of the oligomers, according to the invention can be:

—CH$_2$CH$_2$SH

—COO—CH$_2$CH$_2$CH$_2$SH

—COO—CH$_2$—CH—SH
          |
          CH$_3$

—COO—CH$_2$—CH—CH$_2$SH
          |
          CH$_3$

—COO—(CH$_2$)$_6$—SH etc.

From the fact that it concerns polythiol polyesters obtained from monomerous polyacids, their structure is analogous to that of the oligomers. We have, for example:

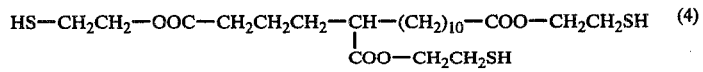

in the case of a triester of ethylene thiol from a hexadecane tricarboxylic acid.

Polythiol-polyesters, according to the invention combine easily with basic sulphur, to give corresponding polysulphurs, useful as plastifiers of various materials, particularly bitumen, where they enhance the cohesiveness and adhesiveness with respect to mineral fillings notably gravel, which, making up new products, come within the scope of the invention and are characterized by a composition similar to that of the polythiol polyesters described before, in which the hydrogen from —SH groups has reacted with the added sulphur to give $H_2S$ and polysulphur groups according to the well known reaction for formation of latter. The poly-sulphurs obtained have a variable structure according to the temperature at which the operation is carried out, and the quantity of sulphur used. Thus, the content of sulphur in these new polysulphurs is from 1 to 10 atoms of sulphur per carboxylic group-COO present in the molecule, which corresponds to polysulphurs ranking 2 to 20 of S. The most current products contain 2 to 6 atoms of S per carboxyl group.

One process, according to the invention, for producing polythiol polyesters, described in the foregoing, consists of esterifying, by means of a mercapto-alcanol, the chosen aliphatic polyacid. Preferably, the operation is carried out in a liquid such as benzene, for example, giving an azeotropic mixture with water formed by esterification. Water is henceforth eliminated progressively in the formation of the polyester.

According to the nature of the polyacids and those of the mercapto-alcanols used, the temperature of the esterification can vary, but it is generally in the order of 50° to 150° C, and preferably from 70° to 100° C. As in other esterifications, it is advantageous to add an acid catalyser, in particular an aryl-sulfonic acid.

The various oligomerous acids that are usable can be represented in the aggregate by the formula:

in which R', R" have the same significance as in the foregoing in regard to formula (1).

We actually find in commerce, oligomers, principally dimers or trimers of fatty non-saturated acids mainly in C13, which agrees perfectly with the objects of this invention. They are, for example, polyacids sold under the trade name "EMPOL" by the Societe Unilever-Emery N.V. de Gouda (Hollande). Such oligomerous fatty unsaturated acids are likewise written about by Norman O.V. SONNTAG in "INTERSCIENCE" vol. 5 under the title of "Fatty Acids" on pages 3572–3580.

As the mercapto-alcanols, we can employ various compounds HO-R-SH where the R group is defined previously in the formula (1) and in the paragraphs following formula (3). Thus, we can esterify the nonsaturated polyacid by means of the mercapto-ethanol, mercapto-propanol (or isopropanol), mercapto-butanol (or isobutanol), mercapto-octanols, etc. The mercapto-ethanol is particularly interesting.

Furthermore, several different mercapto-alcanols can be used jointly to form mixed, non-saturated, polythiol-polyesters. Similarly, we can be interested in utilizing cooligomers of different monomerous acids, as in the case of the oleic-linoletic co-dimer described by J. C. COWAN in vol. 39 of the Journal American Org. Chemistry Society, (Dec. 1962) previously mentioned page 537.

The transformation of polythiol-polyesters into polysulphur-polyesters (or mixed polyesters, thiols and polysulphurs) is brought about, in accordance with the invention, by heating with basic sulphur. While this operation can take place in a large enough temperature range, notably 50° and 250° C, it is preferably carried on above the melting point of the sulphur, more particularly between 120° C and 200° C. When the polythiol polyesters derived from nonsaturated fatty acids in C11 to C24, particularly in C18, sulphurization takes place best between 150° and 200° C. Like other sulphurizations of organic compounds, it is recommended that an appropriate catalyst be incorporated in the reacting mixture. Such conventional catalyst are, for example, derived from guanidine, particularly diphenyl-guanidine or others.

A very useful application of the products of the invention, is the production of coatings, mastics (cements), jointings and similar articles from basic hydrocarbon materials of asphalt type, tar, pitch and bitumen, etc. We can use a small addition of these special polyesters, for example, from 0.2 to 7% by weight to appreciably enhance the rheologic, mechanical and thermal properties of such coatings.

These additives are, moreover, the polysulphur-polyesters described previously, especially those obtained from the dimer and trimer acids of the fatty non-saturated acids, called "EMPOL", which serve particularly well as adjuvants to bituminous compounds. They take on an elastomeric character owing to the trimers contained in these acids which have served as reticulants (or cross-linking agents). This mixture of acids, dimers and trimers, easily available commercially, is therefore particularly interesting, as there is no need to add a supplementary reticulant in the bituminous medium.

The polysulphur-polyesters in question give to the bitumen considerable flexibility permitting flexure without breaking a −50° C. Moreover, they enhance the cohesion, resistance to shock, and adhesivity. These products also provide the advantage of non-crystalization in bituminous compounds. In addition to the fact that, the polythiolpolyesters described can, on their own, be used as adjuvants in bituminous compounds, their principal use is to serve as intermediate materials in the preparation of the corresponding polysulphurs.

The invention is described by the following examples although not limited to these:

EXAMPLE 1

Preparation of the unsaturated polythiol-polyester oligomer

The preparation is effected from a mixture of oligomerous fatty acids of C18, known industrially as EMPOL 1024 (Societe UNILEVER—EMERY N.V.). This product contains, by weight, 81% of the dimer of unsaturated aliphatic acid of 18 atoms of carbon, the dimer being also of C36; the 19% remaining are made up of the corresponding trimer (is C54); there are but traces of monomerous acid; the acid index is from 195; average molecular weight 620.

1140g of these oligomers (1.83 moles) are mixed with 312g of mercapto-ethanol (4 moles) in 1500 ml. of benzene containing 10g of benzene-sulfonic acid as a catalyst of esterification. The mixture is placed in a 4 liter reactor, with an agitator and a cooling unit for distilling the azeotropic mixture which the benzene forms with the water coming from the esterification.

The contents of the flask (round bottomed) is heated for 6 hours distilling the azeotropic mixture of benzene-water as the formulation progresses. Thus, we recover 72g of eliminated water (4 moles). The residue in the reactor is washed twice with 1 liter of water, after which the residual benzene is eliminated by distillation.

Thus, we obtain 1230g of oligomerous polythiol-polyester, unsaturated with the following characteristics:

| | |
|---|---|
| acid index | 16 |
| iodine index | 91 |
| saponification index | 202 |
| SH % | 7.9 |
| S % | 8.7 |

The analysis shows that 88.5% of the total sulphur present is in the form of the thiol group (—SH).

EXAMPLE 2

Preparation of the unsaturated polysulphur polyester

To 1000g of unsaturated polythiol polyester, obtained, as described in example 1, add 150g of sulphur flour, and heat the mixture to 180° C while agitating, until all $H_2S$ is driven off, which will take 2 hours. We obtain 1110g of product. The body of elastomer, thus obtained has the following characteristics:

| | |
|---|---|
| SH % | close to 0 |
| S % | 17.8% |
| It is 1.97 atoms S per -COO group | |
| Glass transition temperature | −60° C |

EXAMPLE 3

Preparation of a polysulphur concentrate in bitumen

A preparation similar to that of Example 2 is carried out in a medium of a specific quantity of bitumen in a manner so as to obtain a polysulphur concentrate with the intention of adding it to bodies of bitumen for road topping.

For this, 300g of unsaturated polythiol-polyester, from Example 1, is introduced, with 50g of sulphur in 650g of bitumen, of 80/100 penetration, 1g of diphenylguanidine, sulphurization accelerator is added. All is heated to 180° + 5° C for 2 hours, while agitating. The release of $H_2S$ having decreased substantially, the product is cooled to ambient temperature. It takes on the form of a viscoelastic mass, soluble in bitumen, tar and also aromatic chlorine solvents. This mass is made up of a solution polysulphur-polyester in bitumen containing by weight 34% polysulphur, with 65% bitumen. It has a glass transition temperature, of −58° C. Thermal stability of this product is determined by heating to 300° C for 3 hours. The loss in weight, following this test is negligible.

We have a better stabilization than polysulphur base adjuvants described in French Pat. Nos. 69 10935 and 70 41788.

EXAMPLE 4

Influence of the polysulphur-polyester, according to the invention, on the glass transition temperature (Tg)

On a series of samples, formed by dilution of a concentrate to 34%, as in example 3, in variable quantities of fresh bitumen of 80/100 penetration we determined the Tg by known methods, and the following results were obtained:

| % by weight of polysulphur in the bitumen | 34 | 13.6 | 10.2 | 6.8 | 1.70 |
|---|---|---|---|---|---|
| Tg ° C | −58 | −45 | −35 | −34 | −22 |

We can see that by adding even a small amount of polysulphur, according to the invention, to the bitumen, significantly lowers the glass transition temperature which is an indirect indication of the degree of resistance to flexing.

EXAMPLE 5

Application of compositions of aggregate with bitumen

The concentrate of polysulphur in Example 3 is used in the preparation of a compound of 100 parts small stone and gravel (Vignat aggregate) with a 6.6 parts of bitumen of 80/100 penetration. The latter contains 6.8% of polysulphur from Example 2. The test pieces of this composition were tested for stability by known methods established by Duriez and by Bresilien taken up in detail in publication No. 2 036 843 of French Pat. No. 69 10935, pages 7 and 8, and in "Nouveau Traite de Materiaux de Construction", vol. III - DUNOD 1962, page 681.

Similar test pieces, where the bitumen, however, has no adjuvant were subjected to the same tests. The results were as follows:

| | Stability DURIEZ - 1 mm kg/cm$^2$ | | | | | |
|---|---|---|---|---|---|---|
| | Compounding according to the invention | | | Compounding of bitumen without adjuvant | | |
| | 0° C | 18° C | 50° C | 0° C | 18° C | 50° C |
| Immediately | 168 | 110 | 12 | 121 | 62 | 10.6 |
| After 7 days | 198 | 133 | 14 | 135 | 67 | 12.6 |
| After 7 days with absorption | 207 | 140 | 14.5 | 127 | 59 | 5.8 |

| | Stability BRESILIEN - 1 mm kg | | | | | |
|---|---|---|---|---|---|---|
| | Compounding according to the invention | | | Compounding of bitumen without adjuvant | | |
| | 0° C | 18° C | 50° C | 0° C | 18° C | 50° C |
| Immediately | 3053 | 2000 | 138 | 2300 | 1250 | 116 |
| After 7 days | 3567 | 2310 | 142 | 2670 | 1425 | 183 |
| After 7 days with absorption | 4133 | 2780 | 189 | 2620 | 1250 | 101 |

We can see that, at the same temperature, the stability of the aggregates containing polysulphurs, in accordance with the invention, are considerably better than to those similar bituminous aggregates without adjuvants.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A composition comprising a bituminous compound containing 0.2 to 34% by weight of a polyester the molecule of which contains 0.5 to 10 atoms of sulfur for each carboxylic group present therein, the polyester comprising:
   (a) an alcohol residue of esterification to which is attached a thiol (—SH) group, the alcohol residue consisting of an alkylene having 1 to 8 carbon atoms and is connected at a first end to a carboxyl group on the polyacid and at a second end to a group containing sulfur, and
   (b) an aliphatic polyacid the polyacid consisting of a polymer of a non-saturated fatty acid chosen from the group consisting of oleic, elaidic, linoleic, linolenic or ricinoleic acid, or combinations thereof.

2. A composition as recited in claim 1, wherein the polyacid contains 2 to 5 carboxyl groups.

3. A composition as recited in claim 1, wherein the polyester contains 1 to 10 atoms of sulfur per carboxyl group.

4. A composition as recited in claim 1, which is a dimer and possesses plastic properties.

5. A composition as recited in claim 1, which is a trimer with cross-linking.

* * * * *